United States Patent Office 3,293,873
Patented Dec. 27, 1966

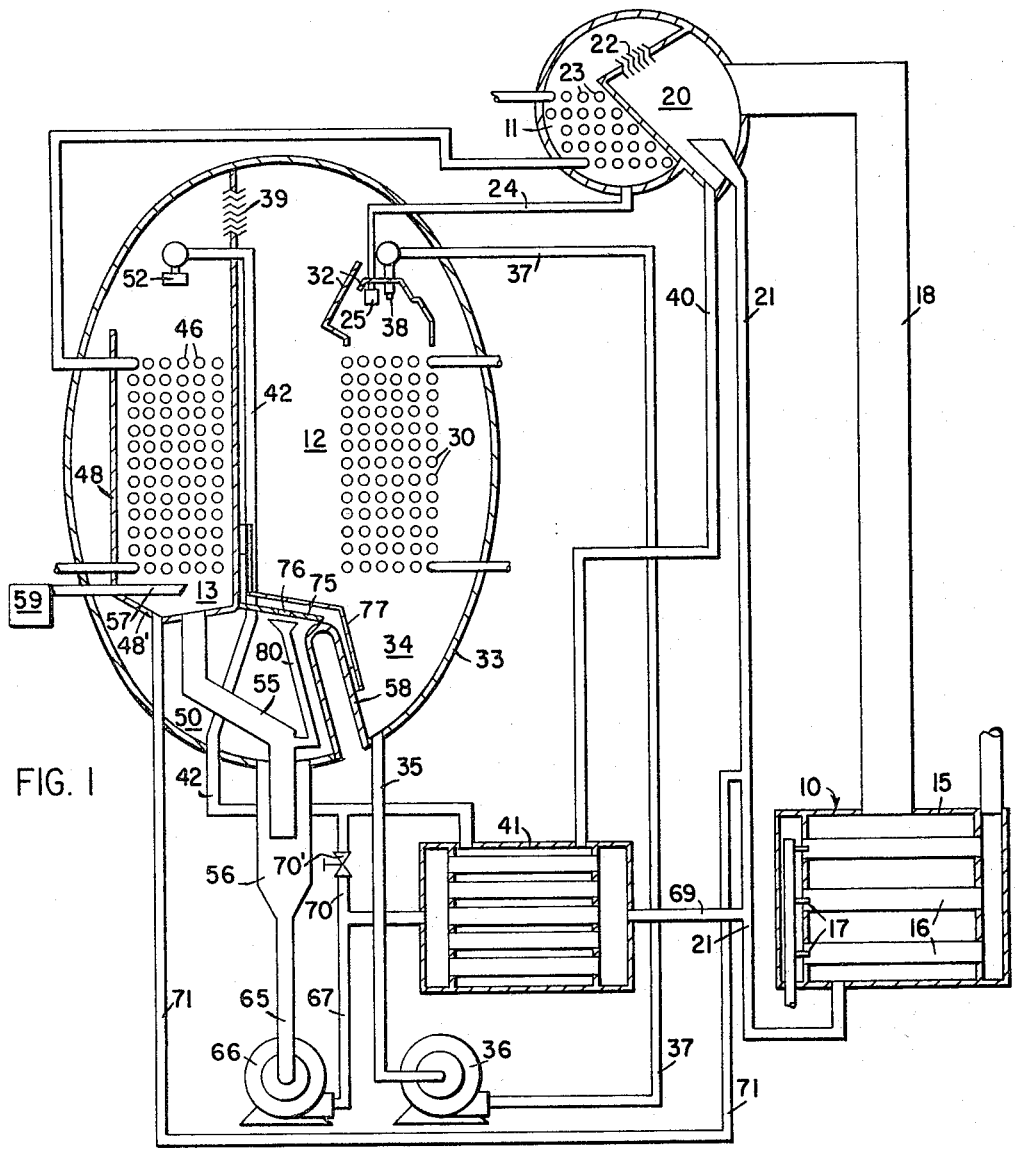

3,293,873
REFRIGERANT CONTROL FOR ABSORPTION REFRIGERATION SYSTEMS
Joseph R. Bourne, Dewitt, and Keith V. Eisberg, Camillus, N.Y., assignors to Carrier Corporation, Syracuse, N.Y., a corporation of Delaware
Filed Apr. 30, 1965, Ser. No. 452,132
8 Claims. (Cl. 62—141)

This invention relates to absorption refrigeration systems, and more particularly, to an absorption refrigeration system having an arrangement for controlling the quantity of refrigerant stored in the system.

By limiting the quantity of liquid refrigerant stored within an absorption refrigeration system, the concentration of the absorbent solution may be effectively controlled. However, known arrangements for adjusting the quantity of stored refrigerant have not proved feasible, in part due to the difficulty of effectively mixing the refrigerant, such as water, with the absorbent solution, such as lithium bromide.

It is a principal object of the present invention to provide a new and improved absorption refrigeration system.

It is an object of the present invention to provide an absorption refrigeration system incorporating an arrangement for controlling the quantity and quality of liquid refrigerant stored in the system.

It is a further object of the present invention to provide an arrangement for withdrawing excess refrigerant in the sump of an absorption refrigeration system and intimately mixing the withdrawn refrigerant with absorbent solution.

It is an object of the present invention to provide an absorption refrigeration apparatus with means to reduce the quantity of refrigerant stored in the refrigerant sump upon contamination thereof by the system absorbent. Other objects of the invention will be readily perceived from the following description.

This invention relates to an absorption refrigeration system. The system includes a shell separated by baffle means into an absorber section including a solution collecting chamber and an evaporator section. A partition member in the shell cooperates with the baffle means to separate the shell into a sump for liquid refrigerant from the evaporator section and a sump for solution from the absorber section. The system further includes a generator. Pump means for passing solution to the generator and conduit means communicating the solution collecting chamber and the solution sump with the pump means are provided. The system has means operable at a predetermined refrigerant level in the refrigerant sump to pass refrigerant into the stream of solution flowing through the conduit means.

The attached drawing illustrates a preferred embodiment of the invention in which:

FIGURE 1 is a diagrammatic view of an absorption refrigeration system incorporating the refrigerant control means of the present invention; and FIGURE 2 is an enlarged fragmentary view of a modified form of the refrigerant control means shown in FIGURE 1.

The absorption refrigeration system of the present invention preferably employs water as the refrigerant and a solution of lithium bromide as the absorbent solution although other refrigerants and absorbents may be employed. As used herein, the term "strong solution" refers to a concentrated solution of lithium bromide which is strong in absorbing power; the term "weak solution" refers to a dilute solution of lithium bromide which is weak in absorbing power.

Referring to the attached drawings, in FIGURE 1, there is shown an absorption refrigeration system including a generator section 10, a condenser section 11, an evaporator section 12 and an absorber section 13 interconnected to provide refrigeration. The evaporator and the absorber sections are placed within a horizontally extending, substantially cylindrical shell 33, as hereinafter described.

Generator section 10 comprises a shell 15 having a plurality of fire tubes 16 passing therethrough. Gas jets 17 supply an ignited mixture of gas and air into fire tubes 16 to heat weak solution which is supplied to the generator. A vapor lift tube 18 extends from the top of shell 15. Weak solution is heated in generator section 10 to boil off refrigerant vapor thereby concentrating the weak solution. A mixture of concentrated absorbent solution and refrigerant bubbles rises upwardly through vapor lift tube 18 and passes into separator chamber 20. Equalizer line 21, connecting the bottom of generator 10 and separator 20, serves as an overflow under some conditions and assists in stabilizing the generator boiling.

Preferably, condenser section 11 is contained in the same shell as separator chamber 20 and comprises a plurality of heat exchange tubes 23. Any suitable cooling medium such as water passes through condenser tubes 23. Refrigerant vapor separates from the mixture of absorbent solution passed to separator chamber 20 and passes to condenser section 11 through eliminators 22. The refrigerant vapor is condensed to liquid refrigerant in condenser section 11 by the cooling medium passing through tubes 23. Liquid refrigerant passes from condenser section 11 through condensate line 24 to spray nozzles 25 in evaporator section 12.

Evaporator section 12 comprises a plurality of longitudinally extending heat exchange tubes 30 disposed in a tube bundle located in a region of shell 33. Water or other heat exchange fluid to be cooled is passed through tubes 30 in heat exchange relation with refrigerant supplied over exterior surfaces of the tubes. Heat is absorbed from the water to be cooled by the refrigerant thereby cooling the water in tubes 30 and vaporizing refrigerant on exterior surfaces of the tubes. The vaporized refrigerant passes from evaporator section 12 into absorber section 13 carrying with it the heat absorbed from the water passed through tubes 30. The chilled water may be circulated to a place of use as desired. Baffles 32 are provided to direct refrigerant vapor from the spray nozzles 25 toward the tube bundle in the evaporator section. Eliminators 39 may be provided in the vapor path between absorber section 13 and evaporator section 12.

Shell 33 includes an evaporator sump 34 to receive unevaporated liquid refrigerant which drips off the lower rows of tubes 30. A refrigerant recirculation line 35 receives refrigerant from sump 34, the refrigerant being pumped by pump 36 through line 37 to nozzles 38 where it is again discharged over the top of the tube bundle in the evaporator section.

Strong solution is passed from the lower portion of separator chamber 20 through strong solution line 40 through heat exchanger 41 in which it is placed in heat exchange relation with weak solution passing to the generator, the strong solution flowing from heat exchanger 41 through line 42 to spray nozzles 52 in the absorber, and is distributed by spray nozzles 52 over longitudinally extending tubes 46 to wet the absorber tubes. Absorber section 13 is contained in shell 33.

Cooling water or other suitable cooling medium is passed through tubes 46 to cool the absorbent solution sprayed on their exterior surfaces.

A partition or baffle member 48 is disposed about the sides and bottom of the tube bundle in the absorber section. The lower part 48' of baffle 48 forms a sump funneling weak solution from the absorber section into absorber discharge conduit 55 and solution line 71. Discharge conduit 55 opens into outlet 56.

The liquid refrigerant in sump 34 and the weak solution in sump 50 are at different temperatures. To maintain physical as well as thermal separation therebetween, the base of shell 33 is provided with a longitudinally extending upstanding partition member 58. Baffle 75 is sealingly secured between member 58 and the lower portion of baffle member 48 to complete the separation of evaporator section 12 from absorber section 13.

A purge line 57 connected to a suitable purge unit 59 may be provided adjacent the lower portion of the tube bundle in absorber section 13.

Absorbent solution is withdrawn from the absorber section through weak solution line 65 connected to outlet 56 of the absorber section. Weak solution is forwarded by pump 66 through line 67, heat exchanger 41 and line 69 to equalizer line 21 where it passes to generator section 10 for reconcentration. If desired, a portion of the weak solution discharged by pump 66 may be passed through weak solution recirculating line 70 to mix with concentrated absorbent solution in line 42 for discharge through spray nozzles 52. Valve 70' in line 70 regulates the flow of weak solution through recirculating line 70.

Solution line 71, provided between equalizer line 21 and collection sump 48', maintains the proper solution level in generator section 10 when the machine is placed in operation.

In the FIGURE 1 embodiment, drain opening 76 is provided in baffle 75. Conduit 80, disposed adjacent baffle 75, conveys refrigerant passing through opening 76 in baffle 75 through solution sump 50 into solution discharge conduit 55. Since solution in sump 50 is warmer than the refrigerant in sump 34 which may cause refrigerant vapor to form in conduit 80, conduit 80 is made relatively large to permit refrigerant vapor to vent and insure uninterrupted flow of refrigerant therethrough. Baffle plate 77, spaced above baffle 75, ovelays opening 76.

Conduit 80 may be encased by suitable thermal insulation to reduce heat transfer between the solution in sump 50 and the refrigerant passing through conduit 80. If desired, conduit 80 may be arranged in sealing engagement with the underside of baffle 75.

Refrigerant accumulated in sump 34, which overflows partition member 58, passes through opening 76 in baffle 75 and conduit 80 into the stream of weak solution flowing through the discharge conduit 55 to the suction side of pump 66. By this arrangement, the amount of refrigerant held in storage may be effectively controlled. By controlling the quantity of refrigerant stored, overconcentration of the absorbent solution is prevented. And, by discharging the refrigerant directly into the stream of solution, immediate circulation of the refrigerant throughout the system is insured.

Conduit 80 is arranged so that the junction thereof with solution discharge conduit 55 is below the normal operating solution level in conduit 55 to seal conduit 80 and prevent gas flow between evaporator section 12 and absorber section 13. The junction of conduit 80 with conduit 55 is arranged so that the liquid heads in conduits 55, 80, taking into account the differences in specific gravity between the solution and refrigerant, insure flow of refrigerant into the solution.

Conduit 80 may communicate with weak solution line 65 when the height of evaporator sump 34 is sufficient to offset the differences in the relative liquid heads of solution and refrigerant to insure flow of refrigerant into the solution.

Referring to FIGURE 2 of the drawings, where like numerals refer to like parts, a conduit 90 having an open end 91 disposed in evaporator sump 34, is connected to solution discharge conduit 55. A part of conduit 90 is arranged at a preselected refrigerant level above end 91 thereof as for example, by means of looped portion 92.

The part of conduit 90 between looped portion 92 and conduit 55 is inclined downwardly at 93. Conduit 90 may be disposed entirely within shell 33 if desired.

When the level of refrigerant in sump 34 rises above the effective height of looped portion 92, the excess refrigerant drains through conduit 90 into the stream of solution discharging through conduit 55. The pressure-temperature relation of the refrigerant in the evaporator section 34 during system operation is such that the refrigerant is close to vaporizing. As the level of refrigerant in evaporator sump 34 falls below the effective height of looped portion 92, conduit 90 attempts to syphon the refrigerant. The resulting low pressure in conduit 90 vaporizes refrigerant in conduit 90 to interrupt the flow of refrigerant through conduit 90.

Should the absorbent such as lithium bromide intermix with the refrigerant in evaporator sump 34 to any appreciable degree, the boiling point of the mixture is lowered. Conduit 90, once the level of the mixture in sump 34 rises above the effective height of looped portion 92, withdraws excess mixture as described above. However, since the boiling point of the mixture is lower than that of refrigerant alone, conduit 90 may syphon mixture from sump 34 when the level of the mixture falls below the effective height of looped portion 92. Conduit 90 syphons mixture until mixture in conduit 90 vaporizes. The amount of mixture syphoned through conduit 90 is dependent upon the percentage of absorbent in the refrigerant in sump 34. Normally, the greater the percentage of absorbent, the more mixture syphoned from pump 34 by conduit 90. The maximum amount of mixture which conduit 90 may remove is determined by the disposition of end 91 of conduit 90 in sump 34.

By the construction of FIGURE 2 the level of liquid refrigerant in evaporator sump 34 is effectively controlled and, where the refrigerant becomes contaminated with absorbent, a quantity of contaminated refrigerant, dependent upon the degree of contamination, is removed.

While we have described a preferred embodiment of the invention, it will be appreciated that the invention is not limited thereto since it may be otherwise embodied within the scope of the following claims.

We claim:

1. In an absorption refrigeration system, the combination of: a shell; baffle means separating said shell into an absorber section including a solution collecting chamber and an evaporator section; said shell including a partition member cooperable with said baffle means to separate said shell into a sump for liquid refrigerant from said evaporator section and a sump for solution from said absorber section; a generator; pump means for passing solution to said generator; conduit means communicating said solution collecting chamber and said solution sump with said pump means; and means operable at a predetermined refrigerant level in said refrigerant sump to pass refrigerant into the stream of solution flowing through said conduit means.

2. An absorption refrigeration system according to claim 1 in which said refrigerant level responsive means includes a line arranged to conduct refrigerant from said refrigerant sump into the stream of solution flowing through said conduit means.

3. An absorption refrigeration system according to claim 2 in which a part of said line is arranged at said predetermined refrigerant sump level, said line opening into said refrigerant sump below said predetermined level, said line being adapted to pass refrigerant above said predetermined level into said conduit means; said line being adapted to reduce the level of refrigerant in said refrigerant sump below said predetermined level when refrigerant flowing through said line from said refrigerant sump is contaminated with absorbent from said system.

4. An absorption refrigeration system according to claim 2 in which said baffle means includes a side bridging the space between said partition member and said solution collecting chamber, said side having a passage therethrough opening into said line to permit refrigerant above said predetermined refrigerant sump level to pass through said passage into said line.

5. An absorption refrigeration system according to claim 4 in which said baffle means includes a second side spacedly overlying said baffle means first side opposite said passage.

6. The absorption refrigeration system according to claim 2 wherein said line is thermally insulated.

7. An absorption refrigeration system according to claim 2 in which said conduit means includes a first conduit communicating with said absorber section sump and a second conduit between said solution collecting chamber and said first conduit, said line opening into said second conduit.

8. An absorption refrigeration system according to claim 4 in which the inlet of said line is spaced from said baffle means side.

References Cited by the Examiner

UNITED STATES PATENTS 2,855,765  10/1958  Smith et al. _____ 62—494 X

LLOYD L. KING, *Primary Examiner.*